United States Patent
Isoda

(10) Patent No.: US 7,155,555 B2
(45) Date of Patent: *Dec. 26, 2006

(54) COMMUNICATION SYSTEM AND METHOD OF CONTROLLING SAME

(75) Inventor: Takashi Isoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/179,533

(22) Filed: Jul. 13, 2005

(65) Prior Publication Data

US 2005/0251610 A1  Nov. 10, 2005

Related U.S. Application Data

(63) Continuation of application No. 10/369,553, filed on Feb. 21, 2003, now Pat. No. 6,978,339.

(30) Foreign Application Priority Data

Feb. 22, 2002  (JP)  ............... 2002-046429

(51) Int. Cl.
G06F 13/00  (2006.01)

(52) U.S. Cl. ................. 710/313; 710/107; 710/8; 710/58

(58) Field of Classification Search ........ 710/107–111, 710/305–313, 8–14, 31–33, 58–63; 346/231; 358/1.13–1.14; 714/44, 748; 361/683
See application file for complete search history.

(56) References Cited

U.S. PATENT DOCUMENTS

| | | | |
|---|---|---|---|
| 6,073,205 A | 6/2000 | Thomson | 711/100 |
| 6,122,676 A | 9/2000 | Brief et al. | 710/9 |
| 6,311,294 B1 | 10/2001 | Larky et al. | 714/44 |
| 6,647,016 B1 | 11/2003 | Isoda et al. | 370/412 |
| 6,795,872 B1 | 9/2004 | Page et al. | 710/8 |
| 6,804,727 B1 | 10/2004 | Rademacher | 710/9 |
| 2002/0001104 A1 | 1/2002 | Shima | 358/442 |
| 2003/0163612 A1 | 8/2003 | Isoda | 710/14 |
| 2003/0231329 A1 | 12/2003 | Edmonds et al. | 358/1.13 |
| 2004/0105117 A1* | 6/2004 | Honda et al. | 358/1.14 |
| 2004/0133708 A1 | 7/2004 | Augustin et al. | 710/8 |
| 2004/0174442 A1 | 9/2004 | Chosa | 348/231.1 |
| 2004/0225808 A1 | 11/2004 | Govindaraman | 710/305 |
| 2005/0251610 A1* | 11/2005 | Isoda | 710/313 |

* cited by examiner

Primary Examiner—Christopher Shin
(74) Attorney, Agent, or Firm—Fitzpatrick, Cella, Harper & Scinto.

(57) ABSTRACT

Cancellation of transmission of print data from a host computer to a printer is implemented under a USB Printer Class protocol without increasing the burden upon a printer on the receiving side. Specifically, when the host computer issues a transmit-abort request to the printer during the transmission of print data, the host computer notifies the printer of cancellation of data transmission via a channel different from that used for the data transmission. Upon being so notified, the printer suspends processing and discards the data that has been received. After suspending the processing, discarding the received data completing the preparation of receiving next data stream the printer notifies the host computer of the completion of abort procedure. Host computer will not send next data stream until receiving the completion of abort procedure from printer.

20 Claims, 13 Drawing Sheets

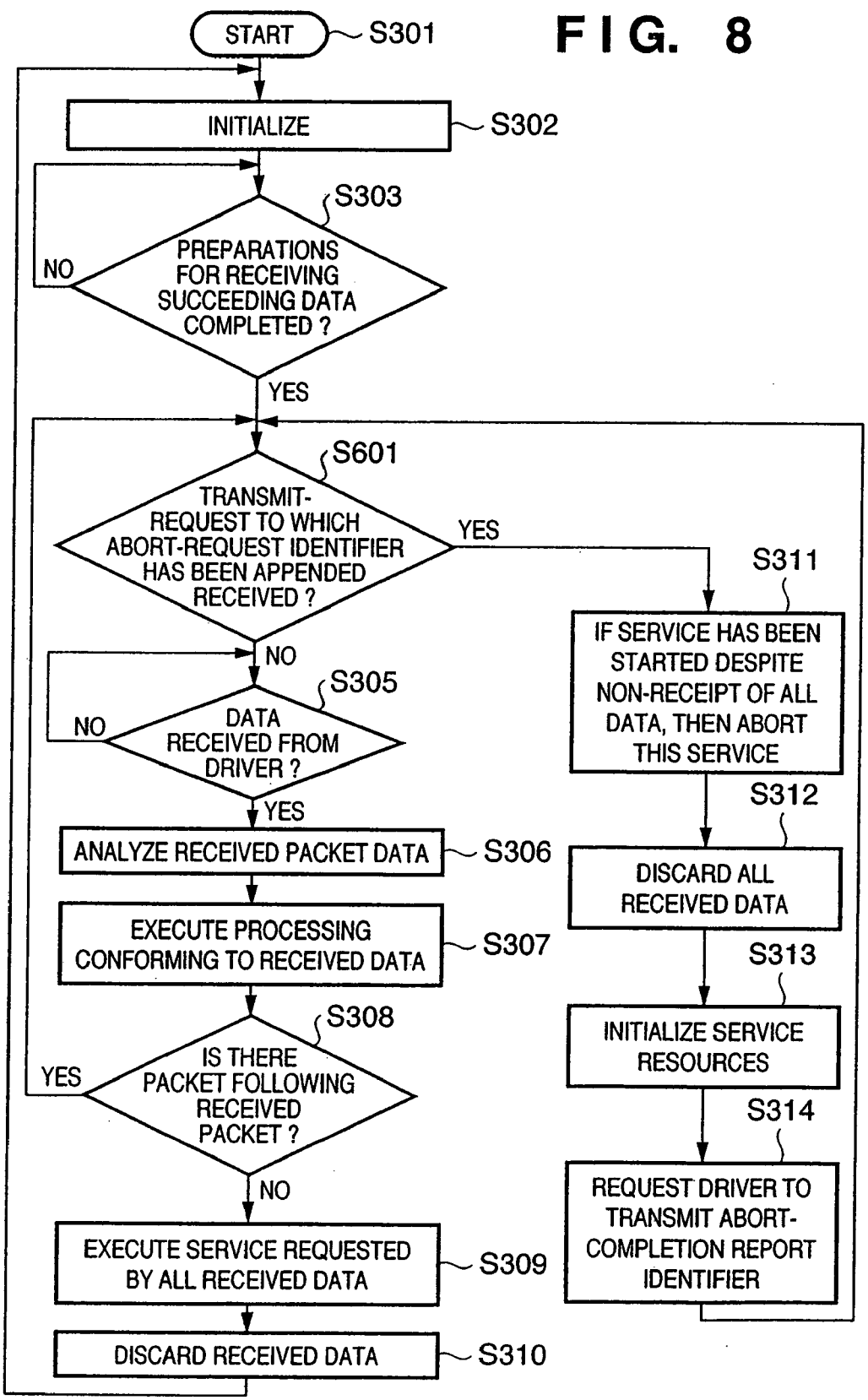

FIG. 9

| Offset | Field | Size | value | Description |
|---|---|---|---|---|
| 0 | bmRequestType | 1 | 0x82 | VendorUnique |
| 1 | bRequest | 1 | 0x01 | AbortRequest |
| 2 | wValue | 2 | 0x00 | |
| 4 | wIndex | 2 | 0x00 | |
| 6 | wLength | 2 | 0x00 | |

901

F I G. 10

1001

| Offset | Field | Size | value | Description |
|---|---|---|---|---|
| 0 | bmRequestType | 1 | 0xC2 | VendorUnique |
| 1 | bRequest | 1 | 0x02 | AbortIndication |
| 2 | wValue | 2 | 0x00 | |
| 4 | wIndex | 2 | 0x00 | |
| 6 | wLength | 2 | 0x08 | |

1002

| AbortInd |
|---|

FIG. 11

| Offset | Field | Size | value | Description |
|---|---|---|---|---|
| 0 | bmRequestType | 1 | 0xC2 | VendorUnique |
| 1 | bRequest | 1 | 0x03 | AbortReq |
| 2 | wValue | 2 | 0x00 | |
| 4 | wIndex | 2 | 0x00 | |
| 6 | wLength | 2 | 0x08 | |

1101

| AbortInd |
|---|

1102

COMMUNICATION SYSTEM AND METHOD OF CONTROLLING SAME

This application is a continuation application of application Ser. No. 10/369,553, now allowed, filed Feb. 21, 2003 now U.S. Pat. No. 6,978,339, which is incorporated herein by reference.

FIELD OF THE INVENTION

This invention relates to a communication system and method of controlling same for performing communication between a computer and printer that communicate in accordance with the USB (Universal Serial Bus) Printer Class specification defined by the USB Forum.

BACKGROUND OF THE INVENTION

USB is a serial-bus standard for connecting a host such as a computer and a function of a peripheral device or the like. USB specifications are not only mechanical and electrical specifications. Protocols conforming to various transfer-mode procedures and types of devices also have been defined by the USB Implementor's Forum, which is a USB standardization group. The defined protocols include a protocol of a USB printer class for connecting a host and a printer by a USB. USB printer class has already been installed, or is capable of being installed, as a USB printer-class driver in, e.g., Windows, which is the Microsoft operating system, the LINUX operating system, and the Macintosh operating system of Apple Computer. Since data is sent and received as packets in the case of USB, multi-channel operation can be achieved. With a printer-class driver, bi-directional communication of data is implemented using two channels, for example, Endpoint 1 and Endpoint 2, among the logical channels (endpoints) provided by USB. Commands defined by USB Printer Class are sent and received by Endpoint 0.

There is no concept of a session in the specifications of USB Printer Class. When communication of data is aborted in mid-course, therefore, there is no way that the receiving side can ascertain such aborting of communication except by checking the content of received data or by detecting timeout.

However, there may also be cases where even if abort has been detected on the receiving side by timeout, there is actually nothing more than a delay in data transmission on the transmitting side and data transmission has in fact not been aborted. More specifically, there are instances where a printer runs out of paper, for example, as a result of which the transmitting side can no longer transmit data and the receiving side detects timeout. There are also cases where the receiving side cannot judge merely from the content of data that aborting of data transmission has occurred.

Thus, there is the danger that a situation may arise in which the processing that should be executed is not because operation on the transmitting side and a judgement made on the receiving side do not agree and, hence, data-transmission abort processing that should not be executed is executed on the receiving side or data-transmission abort processing that should be executed is not executed on the receiving side. For example, consider a case where the transmitting side is a host computer and the receiving side a printer. In such case the printer should respond to suspension of data transmission by discarding data received thus far but not yet printed and construing that data received thenceforth is data constituting a new print job. However, if the printer cannot detect that data transmission has been aborted, then it will execute processing that assumes that the data of the aborted print job and the data of the ensuing new print job is data contained in a single print job. The result is that the wrong content will be printed. Conversely, if the printer misjudges that data transmission has been canceled, then it will abort print processing that should not be abort.

SUMMARY OF THE INVENTION

Accordingly, an object of the present invention is to provide a communication system and method of controlling same, wherein communication is performed in accordance with the USB Class and USB Printer Class specifications whereby the receiving side can be notified reliably and without error of the fact that the transmitting side has aborted data transmission.

More particularly, an object of the present invention is to provide a communication system and method of controlling same in which when the transmitting side is a host computer and the receiving side a printer, the printer is capable of executing an abort procedure upon recognizing abort of data transmission from the host computer effectively and reliably without analyzing the content of the data.

According to the present invention, the foregoing objects are attained by providing a system in which when a data transmitting side aborts data transmission while two electronic devices are communicating in accordance with the USB Printer Class specification, the transmitting side transmits a data-transfer abort command to the receiving side using Endpoint 0.

As a result, the receiving side is capable of ascertaining abort of transmission merely by discriminating the content of the command received via Endpoint 0 without examining the content of data received via Endpoint 1.

Further, the foregoing objects are attained as set forth below.

According to one aspect of the present invention, the foregoing object is attained by providing a communication apparatus for transmitting data to a receiving device by a Universal Serial Bus (USB), comprising:

transmitting means for transmitting data via a data-communication end point; and notification means for notifying the receiving device of abort of data transmission via an Endpoint 0, which is stipulated by USB Class, in a case where a request to abort data transmission is generated during the course of transmission of the data by the transmitting means.

According to a preferred aspect of the present invention, the foregoing object is attained by providing a receiving apparatus to which a communication apparatus is connected by a USB, comprising:

receiving means for receiving data from the communication apparatus via a data-communication end point; and means for discarding data for which transmission has been aborted if the means has been notified of abort of transmission, during reception of data by the receiving means, via an Endpoint 0 stipulated by USB Class.

According to a preferred aspect of the present invention, the foregoing object is attained by providing a communication system in which a computer and an electronic device are connected by a USB line, the computer having a USB port, a USB host-side driver for operating this USB port, and a driver that operates as a USB printer-class host side standardized by the USB Forum, and the electronic device having a USB port, a USB target-side driver for operating this USB port, and a driver that operates as a USB printer-class target side standardized by the USB Forum, wherein if an application program that is a client of the USB printer-class driver on the computer side generates a request to abort transmission at such time that transmission of a complete data stream has not been completed during transmission of the data stream to the electronic device via the USB printer-class driver by a method stipulated by the USB printer-class, then the client is capable of notifying a communication driver of a request to abort transmission; wherein when a data stream whose transmission has been requested is divided into at least two USB packets and is being transmitted to the electronic device by an Endpoint other than Endpoint 1 in accordance with a USB printer-class protocol, the computer sends a soft reset, which is stipulated by the USB printer class, to the electronic device via Endpoint 0 if the client of the USB printer-class driver on the computer side has requested cancellation of transmission of the data stream before completion of transmission of all packets created by dividing and packetizing the data stream whose transmission has been requested.

According to a preferred aspect of the present invention, the foregoing object is attained by providing a communication system in which a computer and an electronic device are connected by a USB line, the computer having a USB port, a USB host-side driver for operating this USB port, and a driver that operates as a USB printer-class host side standardized by the USB Forum, and the electronic device having a USB port, a USB target-side driver for operating this USB port, and a driver that operates as a USB printer-class target side standardized by the USB Forum, wherein if an application program that is a client of the USB printer-class driver on the computer side generates a request to abort transmission at such time that transmission of a complete data stream has not been completed during transmission of the data stream to the electronic device via the USB printer-class driver by a method stipulated by the USB printer-class, then the client is capable of notifying a communication driver of a request to abort transmission; wherein when a data stream whose transmission has been requested is divided into at least two USB packets and is transmitted to the electronic device by an Endpoint other than Endpoint 0 in accordance with a USB printer-class protocol, the computer, after confirming completion of a transmission request for all packets the transmission of which has already been requested of the USB printer-class driver, superimposes an abort-request identifier on an OUT command of a USB vendor-specific command stipulated by the USB standard and transmits the command via Endpoint 0 if the client of the USB printer-class driver on the computer side has requested cancellation of transmission of the data stream before completion of transmission of all packets created by dividing and packetizing the data stream whose transmission has been requested, thereby notifying the printer side of abort of transmission of the data stream, and refrains for transmitting a new data stream until an abort-completion report identifier is received via Endpoint 0 by an IN command of a USB vendor-specific command stipulated by the USB standard.

According to a preferred aspect of the present invention, the foregoing object is attained by providing a communication system in which a computer and an electronic device are connected by a USB line, the computer having a USB port, a USB host-side driver for operating this USB port, and a driver that operates as a USB printer-class host side standardized by the USB Forum, and the electronic device having a USB port, a USB target-side driver for operating this USB port, and a driver that operates as a USB printer-class target side standardized by the USB Forum, wherein if an application program that is a client of the USB printer-class driver on the computer side generates a request to abort transmission at such time that transmission of a complete data stream has not been completed during transmission of the data stream to the electronic device via the USB printer-class driver by a standard stipulated by the USB printer class, then the client is capable of notifying a communication driver of a request to abort transmission; wherein when a data stream whose transmission has been requested is divided into at least two USB packets and is transmitted to the electronic device by an Endpoint other than Endpoint 0 in accordance with a USB printer-class protocol, the computer, after confirming completion of a transmission request for all packets that a computer application has already issued to the USB printer-class driver, superimposes an abort-request identifier on an IN command of a USB vendor-specific command stipulated by the USB standard and transmits a receive request via Endpoint 0 if the client of the USB printer-class driver on the computer side has requested cancellation of transmission of the data stream before completion of transmission of all packets created by dividing and packetizing the data stream whose transmission has been requested, thereby notifying the printer side of abort of transmission of the data stream, and at the same time, refrains for transmitting a new data stream until an abort-completion report identifier is received by the IN command of the USB vendor-specific command.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart illustrating operation on the side of a printer applied to the second embodiment;

FIG. 9 is a diagram illustrating an example of the format of an abort-request identifier of a vendor-specific command according to the first embodiment;

FIG. 10 is a diagram illustrating an example of the format of an abort-completion report identifier receive request of a vendor-specific command according to the first and second embodiments, as well as a diagram illustrating an example of an abort-completion report identifier of a vendor-specific command according to the first and second embodiments; and FIG. 11 is a diagram illustrating an example of the format of an abort-complete report identifier receive request of a vendor-specific command according to the first and second embodiments, as well as a diagram illustrating an example of an abort-complete report identifier of a vendor-specific command according to the first and second embodiments.

DESCRIPTION OF THE PREFERRED EMBODIMENTS

[First Embodiment]

A first embodiment of the present invention will now be described in detail with reference to the drawings.

Figure 3:
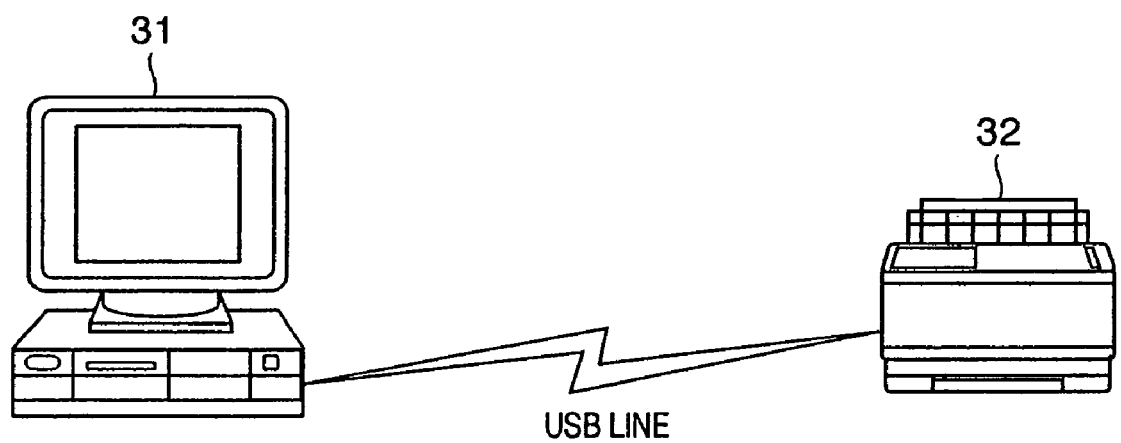
FIG. 3 is a diagram illustrating an example of a connection between the host computer and printer applied to an embodiment.

FIG. 3 shows an example of a system configuration applied to the present invention. As shown in FIG. 3, a host computer 31 and a printer 32 are connected by a USB. Further, USB Printer Class drivers have been installed in the computer 31 and printer 32. These drivers operate in accordance with procedures stipulated by the Printer Class of USB devices.

More specifically, if the printer 32 has been connected to the computer 31 by a USB cable, the host queries the printer 32, in order to execute processing that specifies the connected device as well as configuration processing, using Endpoint 0, which is for transferring control data, stipulated by USB Class. End point 0 must be supported by all USB devices unconditionally. In response to the query, the printer sends back information (vendor ID, product ID, etc.) specifying the device and sends back to the computer 31 information indicating that the some Endpoint, for example, Endpoint 1 will be used in accordance with the method stipulated by USB Printer Class. If the computer subsequently transmits print data to the printer 32, then this is carried out using Endpoint 1.

Figure 1:
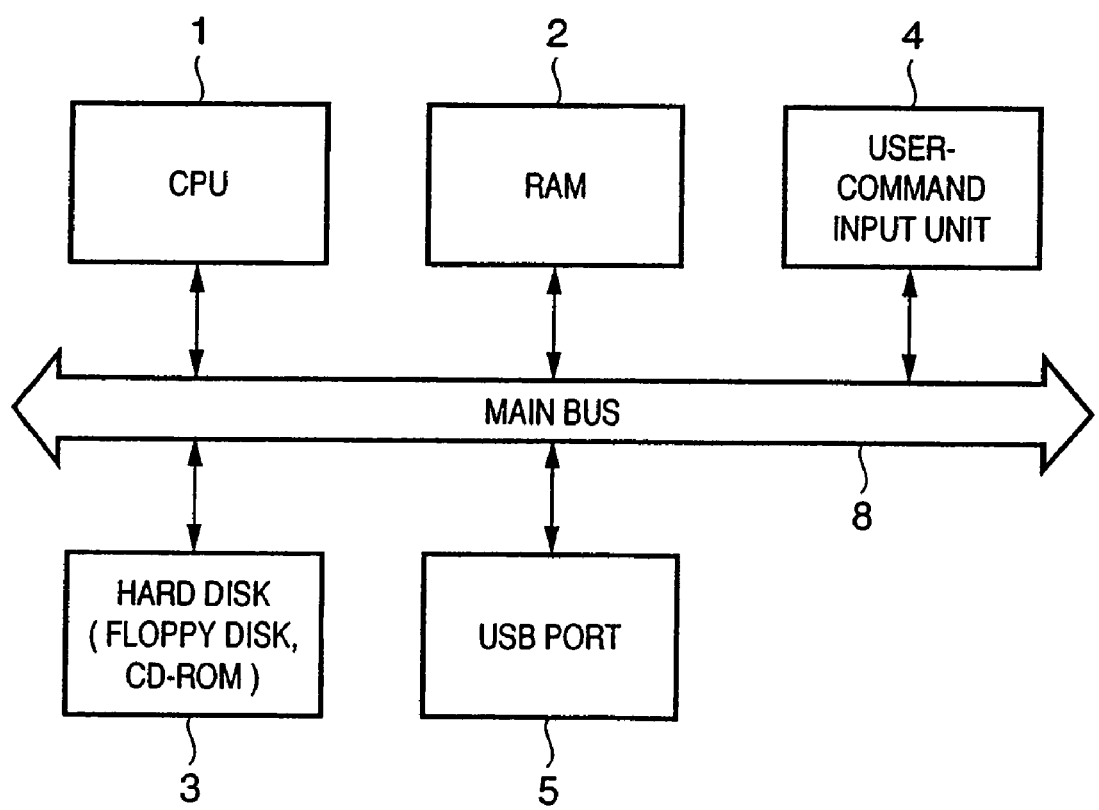
FIG. 1 is an internal block diagram of a host computer applied to an embodiment.

FIG. 1 is an internal block diagram of the host computer 31 shown in FIG. 3. The host computer 31 includes a CPU 1 for controlling the host computer according to this invention; a RAM 2 utilized as a work area, etc., of the CPU 1; a hard disk 3 (though a floppy disk or CD-ROM, etc., will suffice) for storing programs according to the present invention; a user-command input unit 4 (specifically a mouse, keyboard, etc.) for inputting commands from a user; a USB port 5, which is an interface for effecting a connection to a device such as a printer; and a main bus 8 that interconnects these components.

Figure 2:
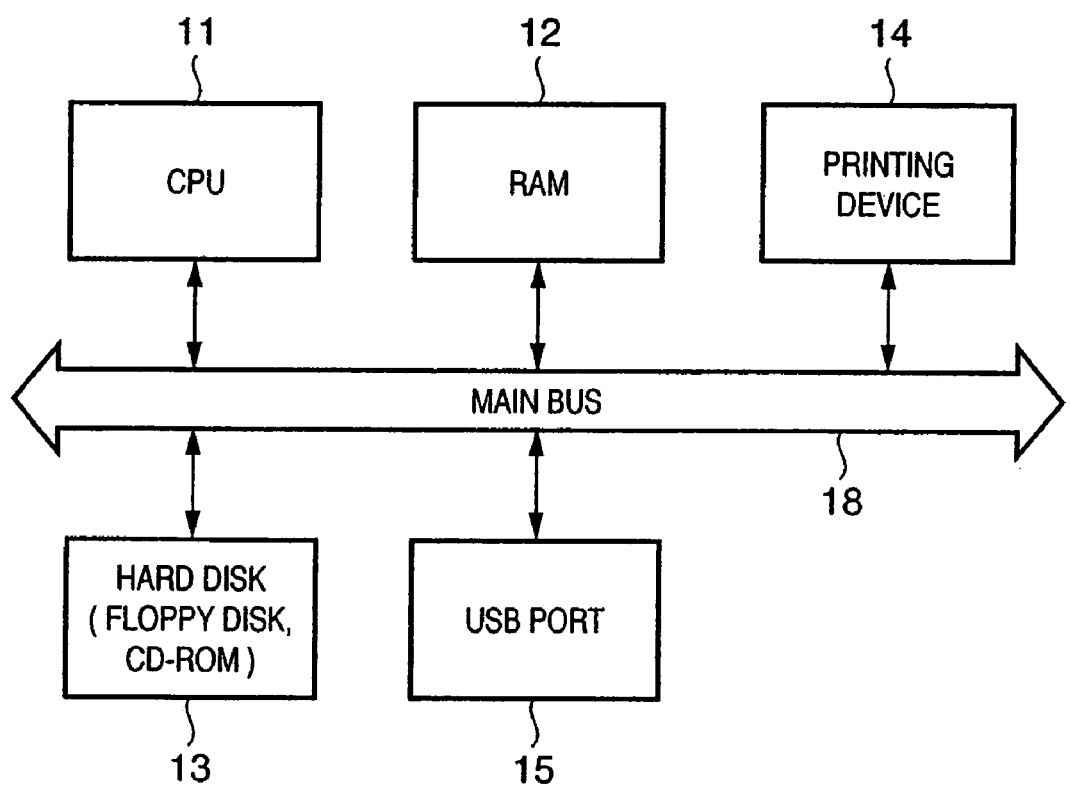
FIG. 2 is an internal block diagram of a printer applied to an embodiment.

FIG. 2 is an internal block diagram of the printer 32 shown in FIG. 3. The printer 32 includes a CPU 11 for controlling the USB printer according to this invention; a RAM 12 utilized as a work area, etc., of the CPU 11; a ROM 13 (though a floppy disk, CD-ROM or hard disk, etc., will suffice) storing a program for controlling a printer according to the present invention; a USB port 15, which is an interface for effecting a connection to the host computer 31; a printing device (printer engine) 14 for executing printing on paper; and a main bus 18 that interconnects these components. The host computer 31 and printer 32 communicate via a USB cable connected to the USB ports 5, 15, respectively.

In this embodiment, unless stated otherwise, the procedure executed by the host computer is implemented by having the CPU 1 run a program, which has been read out of the RAM 2 via the main bus 8, and control the hard disk 3, user-command input unit 4 and USB port 5. Further, the procedure executed by the printing device is implemented by having the CPU 11 run a program, which has been read out of the RAM 12 via the main bus 18, and control the ROM 13, USB port 15 and printing device 14.

<Print-data Transmission Procedure in Host Computer>

Control exercised by the CPU 1 in the system of FIGS. 1 to 3 at the time of printing will be described in detail first with reference to FIGS. 4, 5A and 5B.

Figure 4:
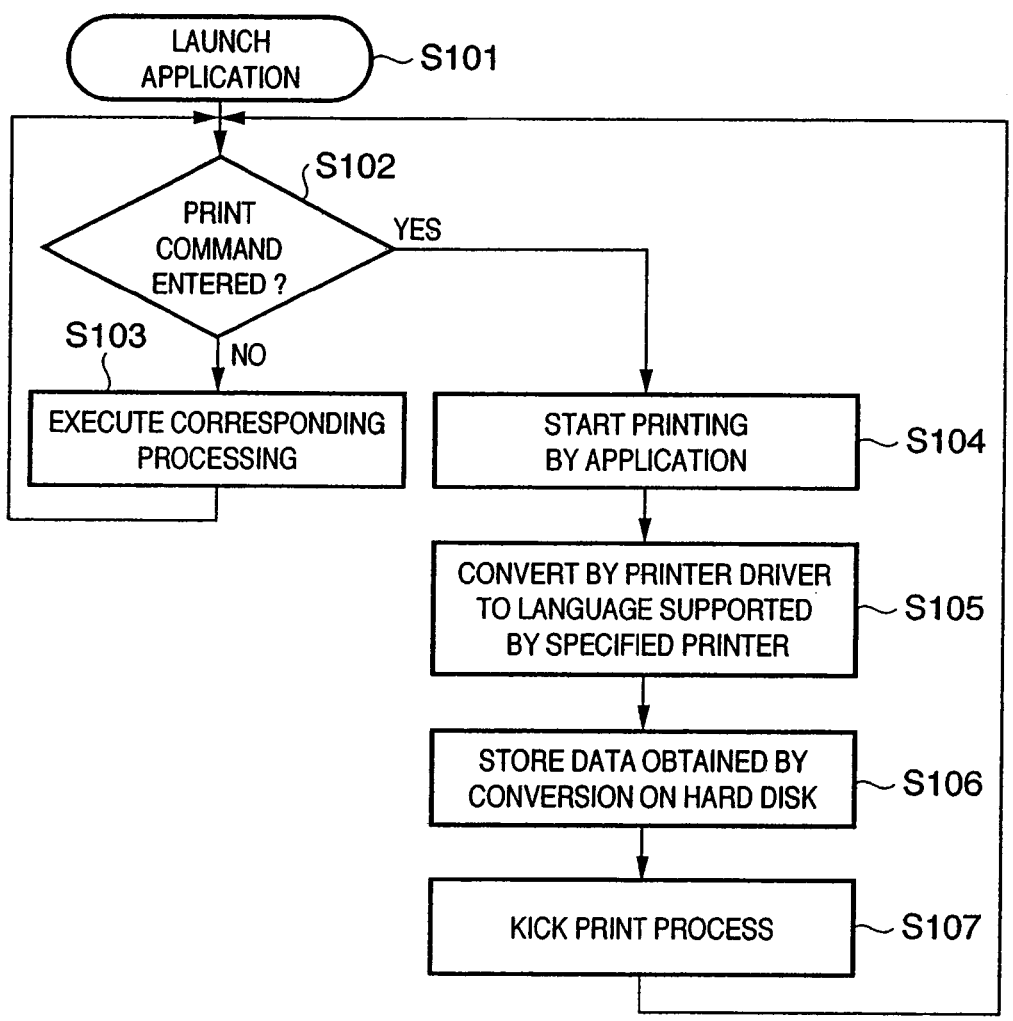
FIG. 4 is a flowchart of an application illustrating operation on the side of the host computer applied to an embodiment.

First, with reference to FIG. 4, the user launches the application (S101), creates data of some kind (text, images, etc.) and enters a print command to print the data (S102). When printing is thus commanded, the application starts print processing (S104) and calls a printer driver. "Print" used in this embodiment does not necessarily signify the recording of characters. It covers the general printing of images in a broad sense, such as the printing of photographs and graphics.

The called printer driver converts the specified data to print data supported by the specified printer (S105) and stores the print data obtained from the conversion on the hard disk 3 (S106). The printer driver "kicks" the printing process so as to cause the printing process to intervene (S107). In this embodiment, "kicking" the printing process means issuing a print request to the printing process. Further, there are cases where the print request is caused to wait depending upon the priority, etc., thereof. This is referred to as print-request kick standby.

The operation of the printing process in the host computer 31 will be described next with reference to FIGS. 5A, 5B. The printing process is a process for transmitting the print data stored on the hard disk 3 to the printer by the USB printer-class driver. In FIG. 5, the printing process waits for issuance of a print request, namely a kick, in the launched state. However, there can be cases where the printing process is launched by the kick.

Figure 5A:
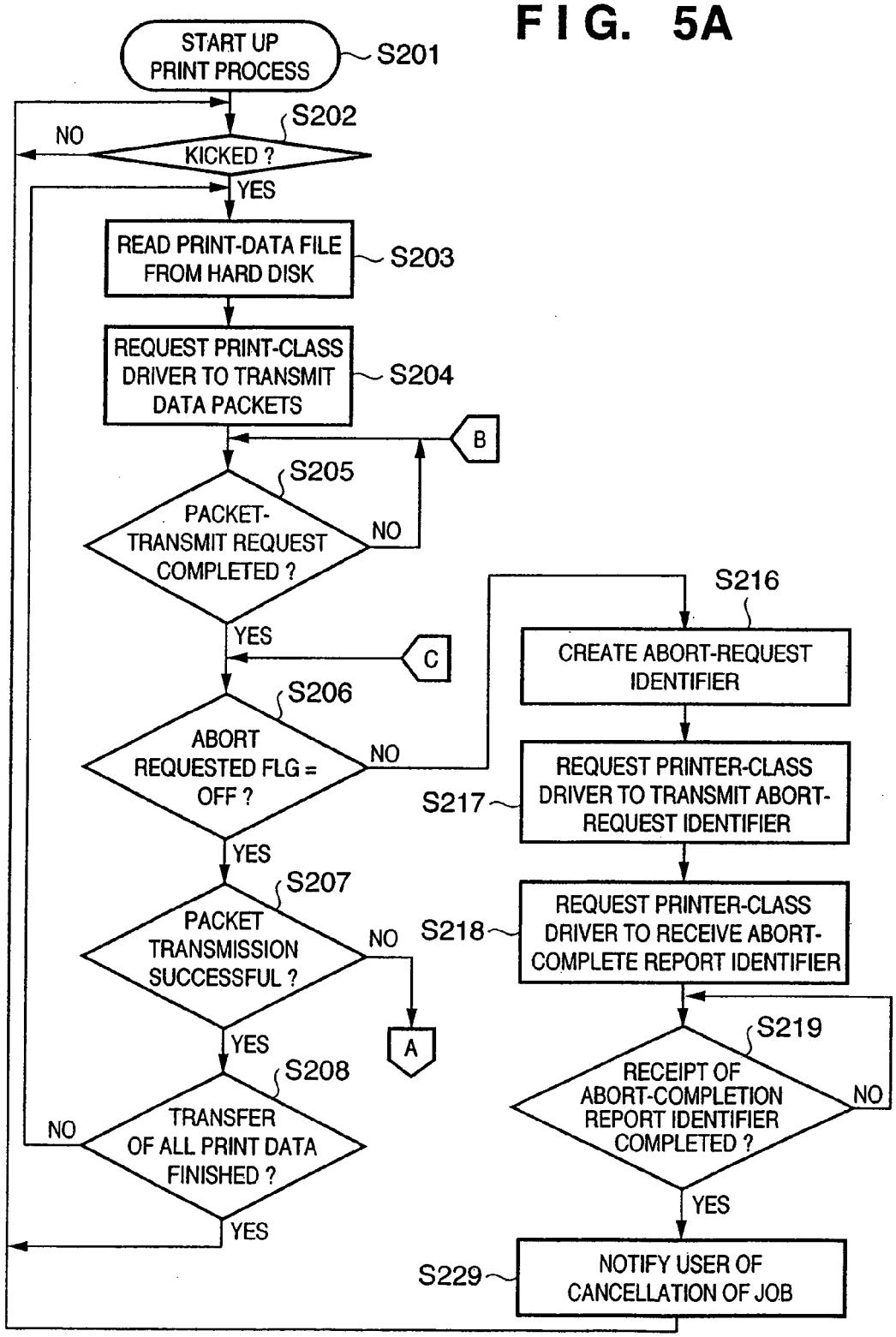
FIG. 5A is a flowchart illustrating operation on the side of a host computer applied to a first embodiment of the present invention.
Figure 5B:
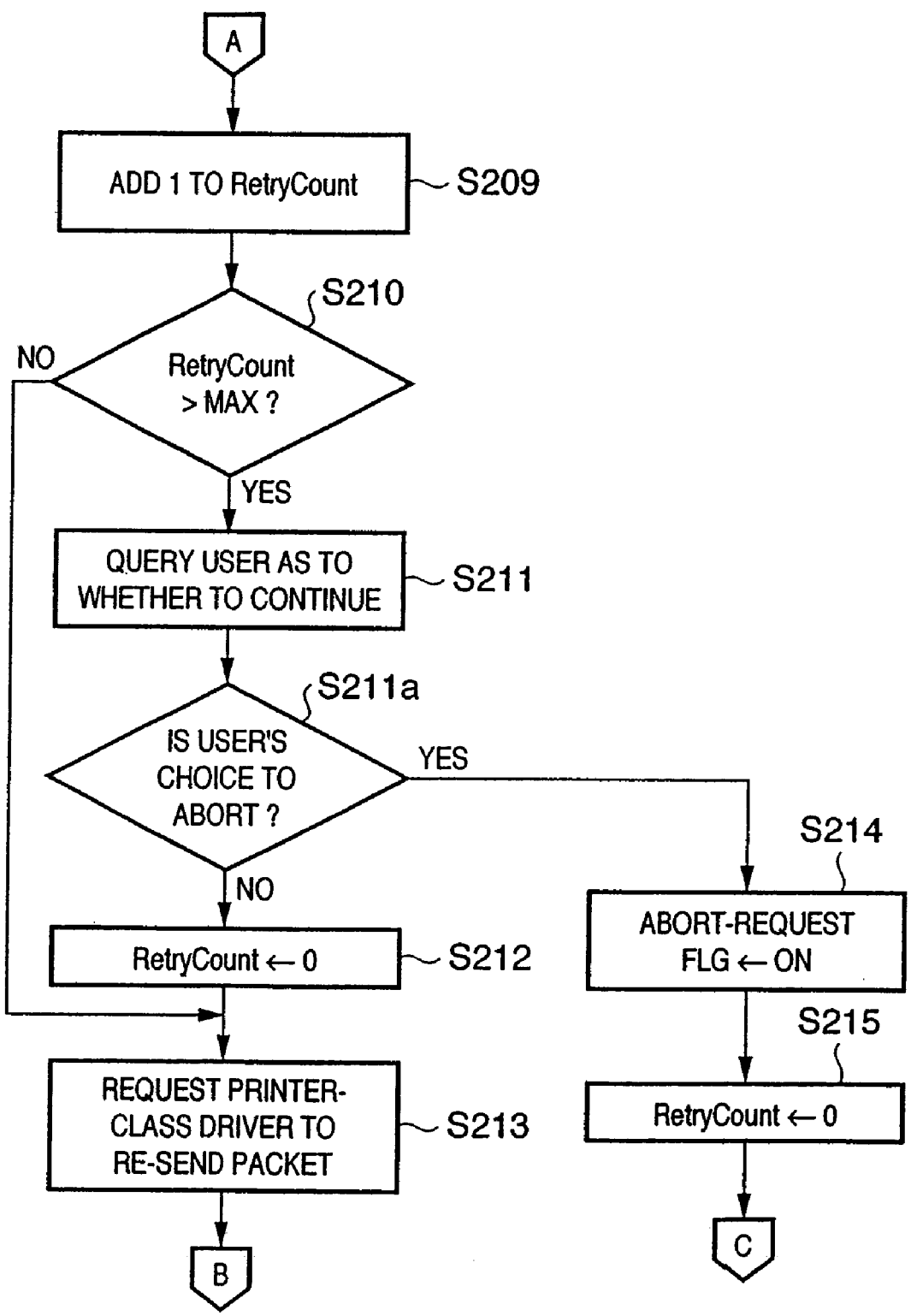
FIG. 5B is a flowchart illustrating operation on the side of the host computer applied to the first embodiment.

In FIGS. 5A, 5B, the printing process is started up (S201). The process then waits for the kick (S202). When the process is kicked, i.e., when the print request is issued, the file that was specified from within the application is opened at kick time and the print data is read from the hard disk 3 (S203). The printing process divides this print data into a plurality of packets and requests the USB printer-class driver to transmit the packets (S204). The process then waits for notification from the USB printer-class driver of the fact that transmission has been completed (i.e., waits for a transmission-completed report) (step S205).

The USB printer-class driver transmits the specified packets to the specified destination in response to the transmit request and, when transmission is completed, issues the transmission-completed report to the client (here the printing process).

If the transmission-completed report arrives, the printing process refers to an abort-request flag (FLG) to determine whether a print-abort request has been received from the application, operating system or user (S206). The abort-request flag is a flag that is set when the user requests abort. The flag is reset (turned OFF) initially.

If the abort-request flag is ON, which indicates that the print-abort request has been received, an abort-request identifier 901 shown in FIG. 9 is created (S216) and the USB printer-class driver is requested to transmit the created abort-request identifier 901 by utilizing a vendor-specific (VendorUnique) command that has been defined in the USB Class (S217). Next, the USB printer-class driver issues an abort-completion report request identifier 1001 (see FIG. 10)

that utilizes the vendor-specific command decided by the USB class, thereby requesting the driver to receive an abort-completion report identifier 1002 (S218). When the abort-completion report identifier 1002 is received (S219), the user is notified of the fact that processing for canceling the present print job has been completed (S229). Processing is then repeated from step S202 onward. It should be noted that the "user" mentioned here is a client of the printing process and is not necessarily the operator. The user may be another process, such as an application process or process of the operating system.

If a print-abort request is not received from the user, etc., at step S206, then it is determined whether the content of the reception-completion report is "TRANSMISSION SUCCESSFUL" or "TRANSMISSION FAILURE" (step S207). If transmission was successful, then it is determined whether transfer of all packetized print data has ended (S208). If transmission of all data has not ended, then processing continues from step S203 onward. If transmission of all data has ended, control returns to step S202 and a new print request is awaited.

If the content of the reception-completion report is "TRANSMISSION FAILURE", a counter RetryCount is incremented (S209). The value of the counter RetryCount is stored in the RAM 2. The value of the counter RetryCount is then compared with a predetermined upper-limit value MAX on the number of retries (S210). If the result of the comparison is that counter RetryCount is equal to or less than MAX, the printer-class driver is requested to re-send the packet for which transmission failed (S213). If the result of the comparison is that counter RetryCount is greater than MAX, then the user is notified of the fact that the number of retries exceeded the predetermined upper-limit value and is queried as to whether printing should be continued (S211). The user is allowed to make the choice and the choice is then discriminated (S211a).

If the user's choice is not "ABORT TRANSMISSION", then counter RetryCount is initialized to zero (S212) and the printer-class driver is again requested to re-send the packet for which transmission failed (S213). If the user's choice is "ABORT TRANSMISSION", then the abort-request flag is set to ON (S214), counter RetryCount is initialized to zero (S215) and control proceeds to step S206, at which processing for canceling printing is executed.

In the above procedure, transmission of print data and aborting of data transmission are reported. Here the transmission of data packets requested at step S204 is performed via the first channel of USB, e.g., Endpoint 1. On the other hand, transmission of the abort-request identifier requested at step S217 is performed via the second channel, e.g., Endpoint 0.

<Print-data Reception Procedure in Printer>

Figure 6:
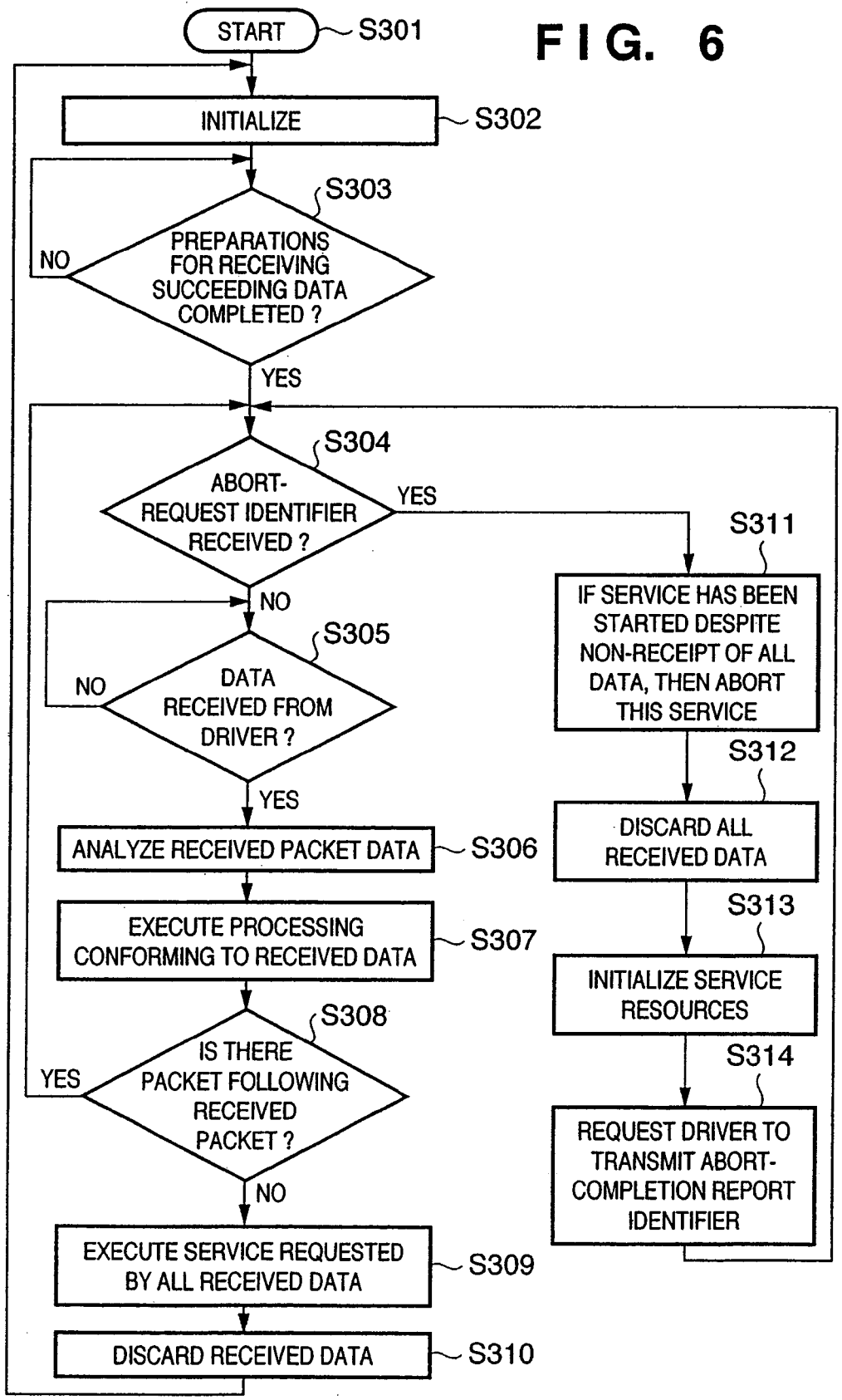
FIG. 6 is a flowchart illustrating operation on the side of a printer applied to the first embodiment of the present invention.

The operation of the printer will now be described in detail with reference to FIG. 6. FIG. 6 shows the procedure of a data analysis process for analyzing data received from the host computer via the USB printer-class driver. Since the present invention is focused on implementing processing, which is for canceling the transmission of print data, synchronously on the transmitting and receiving sides, such details as the analysis of print commands will not be described here.

In FIG. 6, the power supply is turned on (S301) and the printer is initialized (S302). The printer then waits for completion of preparations for receiving print data (S303). Regular processing by the printer standing by with its power supply on commences from step S303.

If the preparations have been completed, first the USB-class driver that has been installed in the printer checks to determine whether the abort-request identifier 901 utilizing the vendor-specific command decided by the USB class has been received (S304).

Assume that the abort-request identifier 901 has been received ("YES" at step S304). If the service that is based upon the received data has already been started up, then this service is aborted (S311) even if receipt of all of the data has not ended. For example, a service that applies here is one that receives print data and expands bitmap data based upon the print data. Next, all of the received data is discarded (S312). The resources of this service are then initialized (S313). The driver is then requested to send the host computer the abort-completion report identifier 1001, which utilizes the vendor-specific command decided by the USB class (S314). Processing then continues from step S304.

It should be noted that the abort-completion report identifier 1001 is transmitted to the host computer via Endpoint 0.

If the abort-request identifier 901 has not been received ("NO" at step S304), then receipt of a data packet from the host computer via the driver is awaited (S305). If a data packet is received, then the received data is analyzed (S306). The appropriate processing is executed based upon the result of analysis (S307). For example, if the received data is printer image data, then the image is expanded in a memory within the printer. It is determined from the content of the received data whether all of the data has been received (S308). If receipt of all data has not ended, processing is executed from step S304. If receipt of all data has been completed, the service that requires all of the received data is executed based upon the received data (S309). For example, if the service is printing, then the printing service is completed and the paper printout is ejected. The received data is then discarded (S310). Processing is then executed from step S302 onward.

In the above procedure, transmission of print data and aborting of data transmission are reported. Here a received data packet is transmitted via the first channel of USB, e.g., Endpoint 1. On the other hand, the abort-request identifier is transmitted via the second channel, e.g., Endpoint 0. Accordingly, by checking the content of the command transmitted via a specific channel, an abort request can be reported reliably from the transmitting side to the receiving side.

In the above embodiment, it is unnecessary to open a channel anew because the abort-request identifier is transmitted via Endpoint 0, which is used by default.

Further, since use is made of a vendor-specific command decided by USB Class, it is possible to implement transmission of the abort request by utilizing existing techniques without making a major design change.

By virtue of such communication between the host computer and printer, interrupt print processing can be implemented, without increasing the load on the receiving side, by a procedure in line with the USB Class and USB Printer Class.

As a result, when an abort request is generated by the computer during transmission of print data from the computer to the printer, the printer can ascertain the fact that there is an abort request from the host computer reliably and without checking all data packets.

[Second Embodiment]

In the first embodiment, the fact that transfer of print data for a certain print job has been aborted by a host computer is conveyed synchronously on the sides of the host computer and printer by a combination of IN and OUT types of a vender-specific (VendorUnique) command decided by the USB class. However, a method of conveying this synchronously solely by the OUT type command also is conceivable. For example, the abort-request identifier 901 of FIG. 9 is of the IN type, and the abort-completion report request identifier 1001 of FIG. 10 is of the OUT type. The type is indicated by the value of a "bmRequestType" field contained in the command. The command is a vendor-specific command of the IN type if the value is 0x01, and the command is a vendor-specific command of the OUT type if the value is 0xC1. The OUT-type command is a command for writing data, and the IN-type command is a command for waiting for writing of data.

Figure 7A:
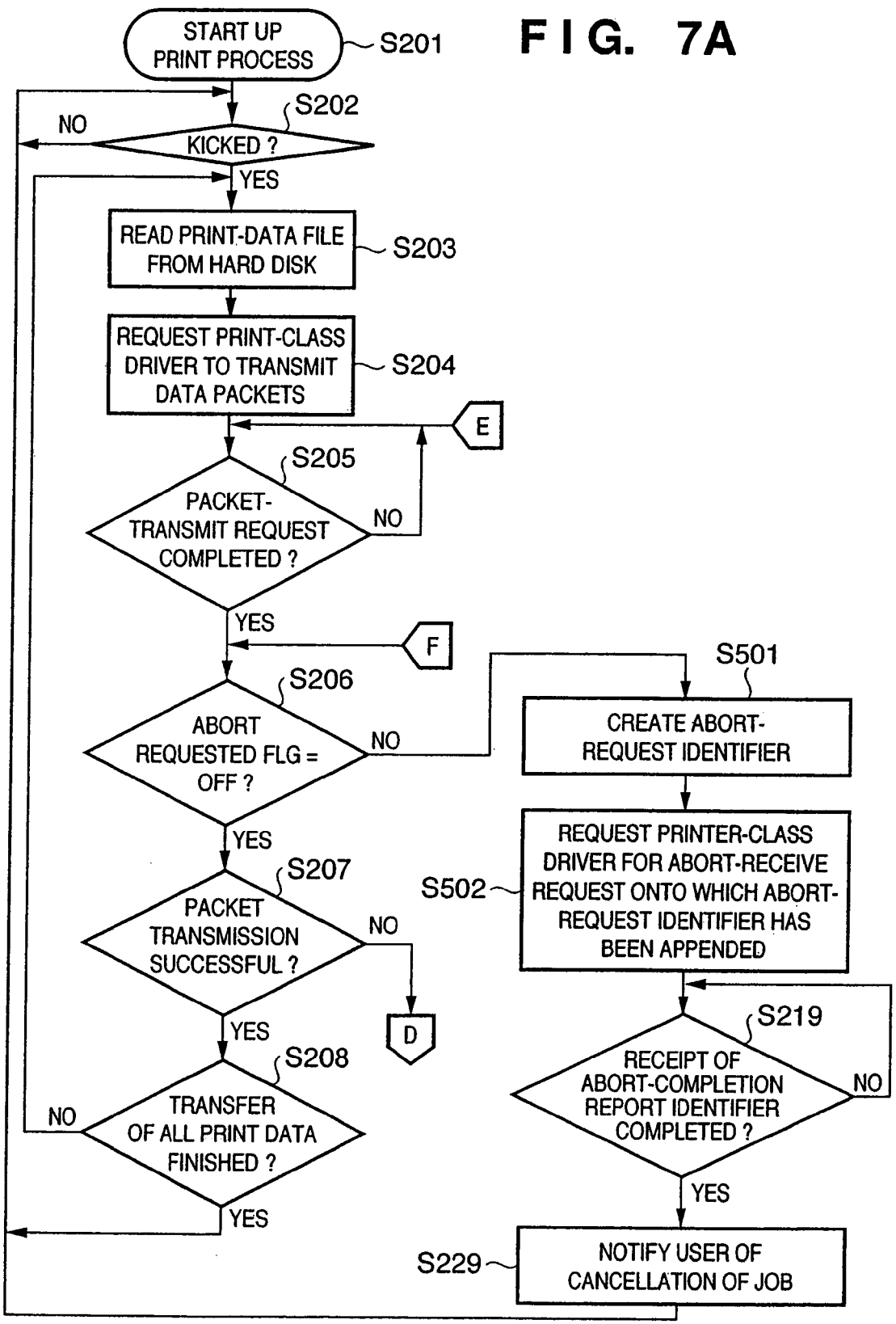
FIG. 7A is a flowchart illustrating operation on the side of a host computer applied to a second embodiment of the present invention.
Figure 7B:
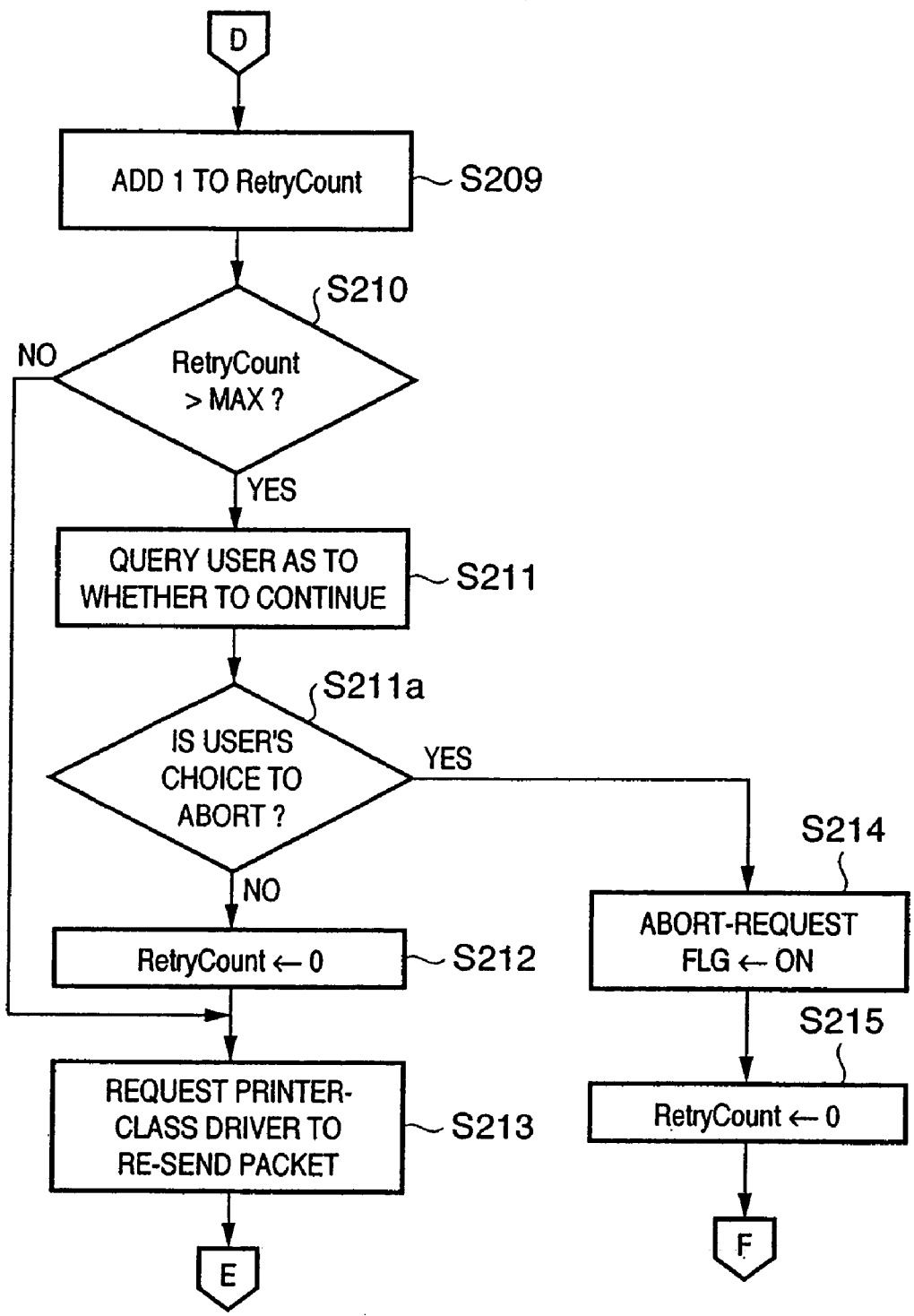
FIG. 7B is a flowchart illustrating operation on the side of a host computer applied to the second embodiment.

More specifically, the procedure of steps S501 and S502 in FIG. 7A is executed instead of steps S216 to S218 in FIG. 5A on the side of the host computer. That is, the transmission of the abort-request identifier is not requested of the printer-class driver. Instead, what is requested of the printer-class driver is an abort-receive request to which the abort-request identifier has been appended.

In response, the printer side executes step S601 of FIG. 8 instead of step S304 of FIG. 6. Specifically, receipt of a abort-request identifier is not tested. Instead, what is tested is receipt of a transmission request to which the abort-request identifier has been appended. The command created at steps S501 and S502 in FIG. 7A at this time is the command 1101 represented in FIG. 11. In this case, transmission of a transmit-abort request and receipt of a transmit-abort completion report 1102 in response to this request can be performed by a single command.

By adopting this arrangement, synchronization relating to data-transmission abort and data discard on the sides of the host computer and printer is respectively possible by a single command. This is advantageous in that line efficiency is improved in comparison with the first embodiment.

[Third Embodiment]

In the first and second embodiments, the fact that transfer of print data for a certain print job has been aborted on the side of a host computer is conveyed using a vendor-specific command decided by the USB printer class. However, it is also possible to achieve this using a soft reset (SoftReset) decided by the USB printer class.

Thus, as described above, it is unnecessary for a printer to examine the content of data when transmission of the data is aborted in mid-course on the side of a host computer. By being notified of abort from the side of the host computer, the printer is capable of performing abort processing without decoding the content of data for which discarding has been instructed. As a result, even in a case where received data for which transmission has been aborted and data transmitted subsequently cannot be distinguished from each other solely from the content of the data, the printer can still distinguish the data. Further, when transmission of data has been aborted in mid-course, a data discard procedure can be executed without the printer analyzing the content of the data. This means that processing can be executed efficiently.

Furthermore, even when the content of data received via Endpoint 1 is checked on the receiving side, the receiving side can reliably ascertain cancellation of transmission merely by evaluating the content of data received via Endpoint 0.

Furthermore, aborted data can be discarded reliably on the receiving side.

Furthermore, even when the content of data received via Endpoint 1 is checked on the receiving side, the receiving side can reliably ascertain cancellation of transmission merely by evaluating the content of data received via Endpoint 0 and can discard the aborted data reliably.

Furthermore, the receiving side can reliably ascertain cancellation of transmission by a soft reset of the USB printer class.

As many apparently widely different embodiments of the present invention can be made without departing from the spirit and scope thereof, it is to be understood that the invention is not limited to the specific embodiments thereof except as defined in the appended claims.

What is claimed is:

1. A printer connected with a computer via a Universal Serial Bus (USB), comprising:
   a receiving unit that receives data from the computer via an endpoint for data communication;
   a printing unit that performs printing based on the data received by said receiving unit; and
   a processing unit that aborts a process when an abort request is notified via a default endpoint for control defined in the USB class while said receiving unit receives data via the endpoint for data communication.

2. A printer according to claim 1, further comprising a response unit that, after discarding received data in response to the abort request, responds that the process has been aborted to the computer via the default endpoint for control defined in the USB class.

3. A printer according to claim 1, wherein said processing unit aborts a process based upon the received data.

4. A printer according to claim 1, wherein the endpoint for data communication is utilized according to a method defined in a USB printer class.

5. A printer according to claim 1, wherein a vendor-specific command is utilized as the abort request.

6. A communication method for a printer connected with a computer via a Universal Serial Bus (USB), comprising:
   a receiving step of receiving data from the computer via an endpoint for data communication;
   a printing step of performing printing based on the data received in said receiving step; and
   a processing step of aborting a process when an abort request is notified via a default endpoint for control defined in the USB class while said receiving unit receives data via the endpoint for data communication.

7. A method according to claim 6, further comprising a response step of, after discarding received data in response to the abort request, responding that the process has been aborted to the computer via the default endpoint for control defined in the USB class.

8. A method according to claim 6, wherein a process based upon the received data is aborted in said processing step.

9. A method according to claim 6, wherein the endpoint for data communication is utilized according to a method defined in a USB printer class.

10. A method according to claim 6, wherein a vendor-specific command is utilized as the abort request.

11. A computer connected with a printer via a Universal Serial Bus (USB), comprising:
    a transmitting unit that transmits data to the printer via an endpoint for data communication; and
    a notifying unit that notifies an abort request via a default endpoint for control defined in the USB class while said transmitting unit transmits data via the endpoint for data communication.

12. A computer according to claim 11, further comprising a receiving unit that, after discarding received data in response to the abort request, receives a response that the process has been aborted from the printer via the default endpoint for control defined in the USB class.

13. A computer according to claim 11, wherein a vendor-specific command is utilized as the abort request.

14. A computer according to claim 11, wherein the abort request is notified when a number of failure of transmission of data exceeds a predetermined value and a user selects an abortion.

15. A computer according to claim 12, further comprising a unit that notifies that the process has been aborted when said receiving unit received the response that the process has been aborted.

16. A communication method for a computer connected with a printer via a Universal Serial Bus (USB), comprising:
    a transmitting step of transmitting data to the printer via an endpoint for data communication; and
    a notifying step of notifying an abort request via a default endpoint for control defined in the USB class while data is transmitted in said transmitting step via the endpoint for data communication.

17. A method according to claim 16, further comprising a receiving step of, after discarding received data in response to the abort request, receiving a response that the process has been aborted from the printer via the default endpoint for control defined in the USB class.

18. A method according to claim 16, wherein a vendor-specific command is utilized as the abort request.

19. A method according to claim 16, wherein the abort request is notified when a number of failure of transmission of data exceeds a predetermined value and a user selects an abortion.

20. A method according to claim 17, further comprising a step of notifying that the process has been aborted when the response that the process has been aborted was received in said receiving step.

* * * * *

UNITED STATES PATENT AND TRADEMARK OFFICE
CERTIFICATE OF CORRECTION

PATENT NO.         : 7,155,555 B2
APPLICATION NO. : 11/179533
DATED                : December 26, 2006
INVENTOR(S)        : Takashi Isoda It is certified that error appears in the above-identified patent and that said Letters Patent is hereby corrected as shown below:

COLUMN 5:
Line 37, "some" should read -- same --.

COLUMN 11:
Line 4, "failure" should read -- failures --.

COLUMN 12:
Line 9, "failure" should read -- failures --.

Signed and Sealed this

Ninth Day of October, 2007

JON W. DUDAS
*Director of the United States Patent and Trademark Office*